(12) United States Patent
Finger-Albert et al.

(10) Patent No.: US 11,482,910 B2
(45) Date of Patent: Oct. 25, 2022

(54) STATOR WITH A TEMPERATURE DETECTION UNIT FOR AN ELECTRIC MOTOR

(71) Applicant: VALEO SIEMENS EAUTOMOTIVE GERMANY GMBH, Erlangen (DE)

(72) Inventors: Christian Finger-Albert, Bad Kissingen (DE); Stefan Oetzel, Schmalkalden (DE); Michael Menz, Hollstadt (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 523 days.

(21) Appl. No.: 16/555,585

(22) Filed: Aug. 29, 2019

(65) Prior Publication Data
US 2020/0076277 A1    Mar. 5, 2020

(30) Foreign Application Priority Data

Aug. 31, 2018 (DE) .................. 10 2018 121 354.9

(51) Int. Cl.
| | |
|---|---|
| H02K 11/25 | (2016.01) |
| H02K 11/04 | (2016.01) |
| G01K 1/14 | (2021.01) |
| H02K 3/28 | (2006.01) |
| G01K 1/02 | (2021.01) |
| H02K 7/00 | (2006.01) |
| B60K 1/00 | (2006.01) |

(52) U.S. Cl.
CPC ............ *H02K 11/25* (2016.01); *G01K 1/026* (2013.01); *G01K 1/14* (2013.01); *H02K 3/28* (2013.01); *H02K 7/006* (2013.01); *H02K 11/044* (2013.01); *B60K 1/00* (2013.01); *B60Y 2400/60* (2013.01); *B60Y 2400/61* (2013.01)

(58) Field of Classification Search
CPC ........ H02K 3/28; H02K 7/006; H02K 11/044; H02K 11/25; G01K 1/14; G01K 1/026; B60Y 2400/61; B60Y 2400/60; B60K 1/00; Y02T 10/70
USPC ...................................... 310/68 C
See application file for complete search history.

(56) References Cited

U.S. PATENT DOCUMENTS

| | | | | |
|---|---|---|---|---|
| 6,028,382 A | * | 2/2000 | Blalock | H02K 11/25 361/25 |
| 8,384,263 B2 | | 2/2013 | Hiramatsu et al. | |
| 9,212,957 B2 | * | 12/2015 | Takahashi | G01K 13/08 |

(Continued)

FOREIGN PATENT DOCUMENTS

| | | | | |
|---|---|---|---|---|
| CN | 102150349 B | * | 6/2014 | ............ H02K 11/20 |
| DE | 102013208200 A1 | * | 11/2014 | ............ H02K 11/25 |

(Continued)

*Primary Examiner* — Alex W Mok
(74) *Attorney, Agent, or Firm* — Manabu Kanesaka

(57) ABSTRACT

A stator for an AC motor, includes windings of a first layer, which extend over a first region of the stator and are connectable to a first phase, and windings of a second layer, which extend over a second region of the stator and are connectable to a second phase, wherein the first region is offset relative to the second region and at least one overlap region is formed which is smaller than the individual regions, and wherein a temperature detection unit is arranged in the overlap region and is designed to measure the temperature of the windings in the overlap region.

12 Claims, 6 Drawing Sheets

(56) References Cited

U.S. PATENT DOCUMENTS

| | | | | |
|---|---|---|---|---|
| 10,454,348 B2 * | 10/2019 | Funayama | | H02K 11/25 |
| 10,971,977 B2 * | 4/2021 | Baba | | H02K 3/04 |
| 2002/0017825 A1 * | 2/2002 | Oohashi | | H02K 3/50 |
| | | | | 310/207 |
| 2002/0180577 A1 * | 12/2002 | Heyden | | G01K 13/00 |
| | | | | 338/25 |
| 2006/0262442 A1 * | 11/2006 | Best | | H02K 11/25 |
| | | | | 360/1 |
| 2009/0140614 A1 * | 6/2009 | Heim | | H02K 11/25 |
| | | | | 310/68 C |
| 2013/0156071 A1 * | 6/2013 | Wan | | H02K 11/25 |
| | | | | 374/E7.018 |
| 2015/0042196 A1 | 2/2015 | Awazu et al. | | |
| 2015/0137635 A1 * | 5/2015 | Firat | | H02K 3/522 |
| | | | | 310/71 |
| 2016/0013705 A1 * | 1/2016 | Takei | | H02K 11/27 |
| | | | | 310/54 |
| 2016/0094102 A1 * | 3/2016 | Hoshina | | H02K 11/25 |
| | | | | 310/71 |
| 2017/0033630 A1 * | 2/2017 | Tamura | | H02K 3/18 |
| 2017/0047797 A1 * | 2/2017 | Darras | | H02K 1/165 |
| 2018/0205277 A1 | 7/2018 | Kuroyanagi et al. | | |
| 2020/0076276 A1 * | 3/2020 | Balling | | H02K 5/10 |

FOREIGN PATENT DOCUMENTS

| | | | | |
|---|---|---|---|---|
| DE | 102013208200 A1 | | 11/2014 | |
| EP | 0150070 A2 | | 7/1985 | |
| EP | 3297134 A1 * | | 3/2018 | H02K 1/16 |
| GB | 2015829 A * | | 9/1979 | H02K 3/12 |
| JP | H1094222 A * | | 4/1998 | |
| JP | 2003092858 A * | | 3/2003 | H02K 11/25 |
| JP | 2014137314 A * | | 7/2014 | G01K 1/14 |
| WO | WO-2017090363 A1 * | | 6/2017 | H02K 11/25 |

* cited by examiner

STATOR WITH A TEMPERATURE DETECTION UNIT FOR AN ELECTRIC MOTOR

RELATED APPLICATIONS

The present application is based on, and claims priority from, German Application No. 10 2018 121 354.9 filed Aug. 31, 2018, the disclosure of which is hereby incorporated by reference herein in its entirety.

The invention relates to a stator with a temperature detection unit for an electric motor.

PRIOR ART

Electric motors are generally known and are being used increasingly to drive vehicles. An electric motor consists of a stator and a rotor.

The stator comprises a plurality of slots, in which the windings are guided. The windings converge and are connected in the winding head. It is necessary for the operation of the electric motor to monitor the temperature in the stator.

Problem and Solution

The object of the present invention is to efficiently determine the temperature of the windings in the stator.

In accordance with the invention a stator for an AC motor comprises windings of a first layer, which extend over a first region of the stator and are connectable to a first phase, and windings of a second layer, which extend over a second region of the stator and are connectable to a second phase, wherein the first region is offset relative to the second region and at least one overlap region is formed which is smaller than the individual regions, wherein a temperature detection unit is arranged in the overlap region and is designed to measure the temperature of the windings in the overlap region.

Two windings, which are fed by different phases, are located in the overlap region. It is thus merely necessary to arrange an individual temperature detection unit on the stator in order to determine the temperature of two windings which are fed by different phases.

In an embodiment of the invention the temperature detection unit can comprise two sensors: one sensor at an outer diameter and one sensor at an inner diameter of the stator, with each sensor being designed to measure the temperature of the windings of the first and second layer in the overlap region.

The temperature detection unit with two sensors can detect the temperature of the windings per phase, wherein, however, the temperature detection unit is arranged merely once on the stator, thus saving signal cable.

It is particularly easy to measure the temperature at the outer and inner diameter of the stator or the winding head.

The stator can preferably comprise windings in a third layer which lie between the first and second layer and extend over a third region of the stator and are connectable to a third phase, wherein one region is offset relative to another region and an overlap region is formed which is smaller than the individual regions, wherein the temperature detection unit is arranged in the overlap region and is designed to measure the temperature of the windings in the overlap region.

In the overlap region it is possible to measure the temperature of windings in all three layers, which are fed by a different phase each, at a single position of the stator.

In a further embodiment of the invention the stator can comprise windings in the first layer which extend over a fourth region of the stator and are connectable to a fourth phase, windings in the second layer which extend over a fifth region of the stator and are connectable to a fifth phase, and windings in the third layer which extend over a sixth region of the stator and can be connected to a sixth phase, wherein the windings of a same layer form a plurality of overlap regions with the windings of another layer, which overlap regions are each smaller than the individual regions, wherein a temperature detection unit is arranged in at least one of the plurality of overlap regions and is designed to measure the temperature of the windings in the overlap region.

Each two windings in adjacent layers form an overlap region. Each two layers in the first and third layer form a further overlap region. Three windings in different layers form a total overlap region.

With the selection of the position of the temperature detection unit in one of these overlap regions, the temperature of a plurality of windings can be detected at this selected position. In the most advantageous case the temperature of three windings can be detected at a single position. The entire overlap region and the further overlap region are each provided for example four times on the stator.

Windings of the first or second layer which extend over two regions of the same layer can preferably form an extended overlap region with windings of the third layer which extend over one region and windings from a further region of the first or second layer, wherein a temperature detection unit is arranged in the extended overlap region and is designed to measure the temperature of the windings.

The extended overlap region lies at the edge of the region of a winding in the first or second layer. The windings of a further phase start directly in one of these layers. There is thus an extended overlap region, in which the temperature of three windings, which are each fed by a different phase, can be measured at the outer and inner diameter.

An electric motor can further preferably comprise at least two rectifiers, and each of the rectifiers can be connectable to at least one winding, wherein the windings lie in different layers.

The windings in different layers form an overlap region, and within this overlap region it is possible to determine the temperature of windings which are fed by different rectifiers using a single temperature detection unit.

The electric motor can more preferably comprise at least two rectifiers, and each of the rectifiers can be connected to windings in three different layers and a half stator region (A, B).

The windings can thus be connected to different rectifiers and at the same time provide an overlap region, in which the temperature detection unit detects the temperature of windings which are fed by different rectifiers.

In one embodiment of the invention the temperature detection unit can be designed to detect the temperature of at least two windings in different stator regions.

The windings in different stator regions can thus be attached to different rectifiers and at the same time provide an overlap region in which the temperature detection unit detects the temperature of windings which are fed by different rectifiers and lie in different stator regions.

In a further embodiment of the invention the electric motor can have two temperature detection units and each temperature detection unit can be arranged in one of the two total overlap regions.

In the two total overlap regions the temperature of three windings can be detected in each case. It is thus possible to monitor the temperature of all six windings, which are fed by six phases of the two rectifiers, merely at two positions of the stator.

In accordance with the invention a vehicle comprises a stator or an electric motor according to one of the preferred embodiments.

DESCRIPTION OF THE DRAWINGS

FIG. 1 shows the winding schema of a stator for an electric motor. As can be seen from this figure, the windings are arranged in three layers. The windings in each layer are fed by at least two phases. On the whole, FIG. 1 shows an electric motor that is fed by a total of 6 different phases A1, A2, A3, B1, B2, B3, wherein each three phases are provided by different rectifiers. Each rectifier feeds three phases in one stator region each.

Figure 1:
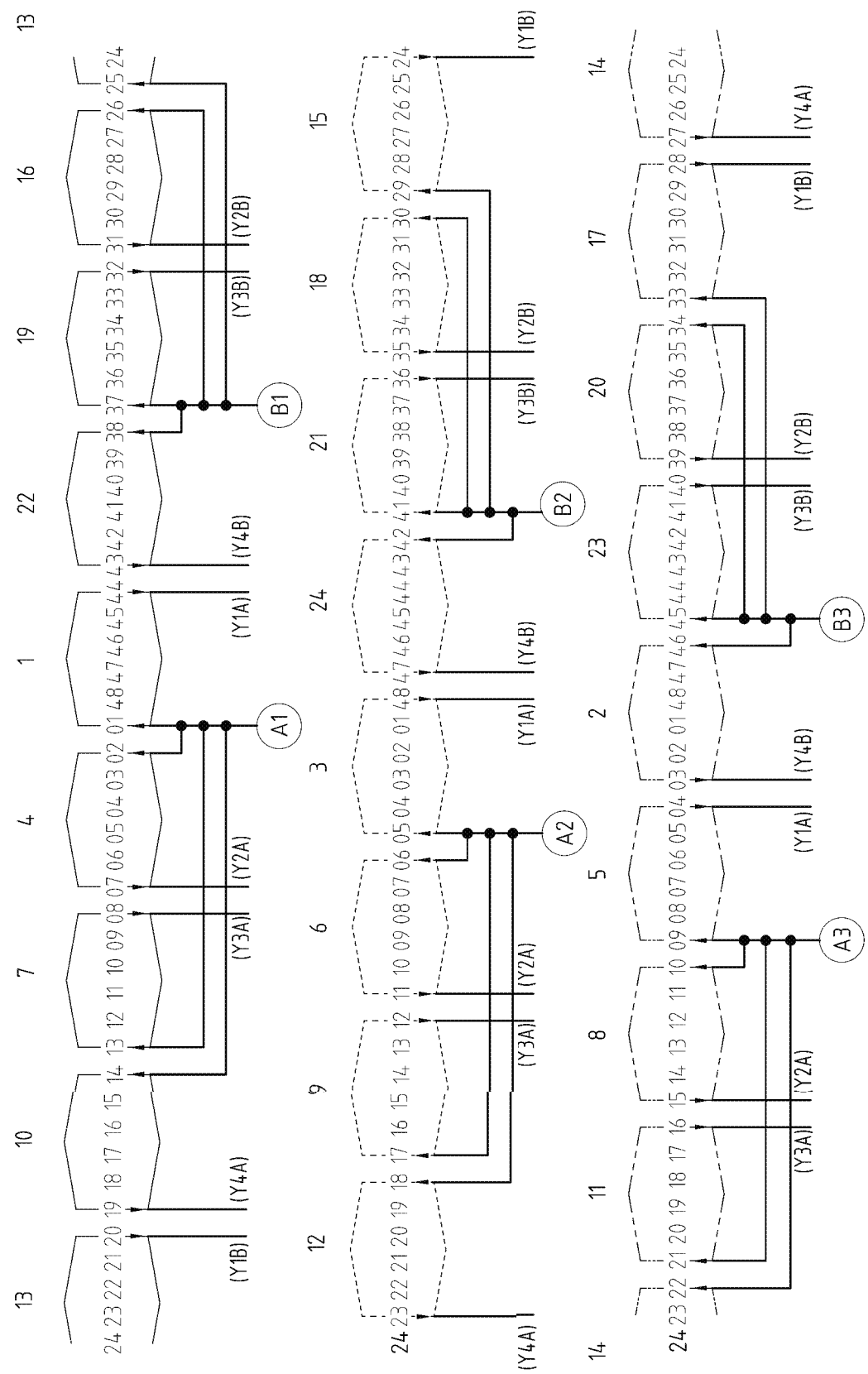
FIG. 1 shows a winding schema of an electric motor.

As can also be seen in FIG. 1, the windings which are fed by a first phase A1 extend from slot 19 to slot 44. The windings in this layer which are fed by a second phase B1 extend from slot 43 to slot 20.

The windings of phase A2 in the second layer extend from slot 23 to slot 48. The windings of phase B2 extend from slot 47 to 24. The windings of phase A3 in the third layer extend from slot 4 to slot 27. The windings of phase B3 in the third layer extend from slot 28 to slot 3.

Figure 2:
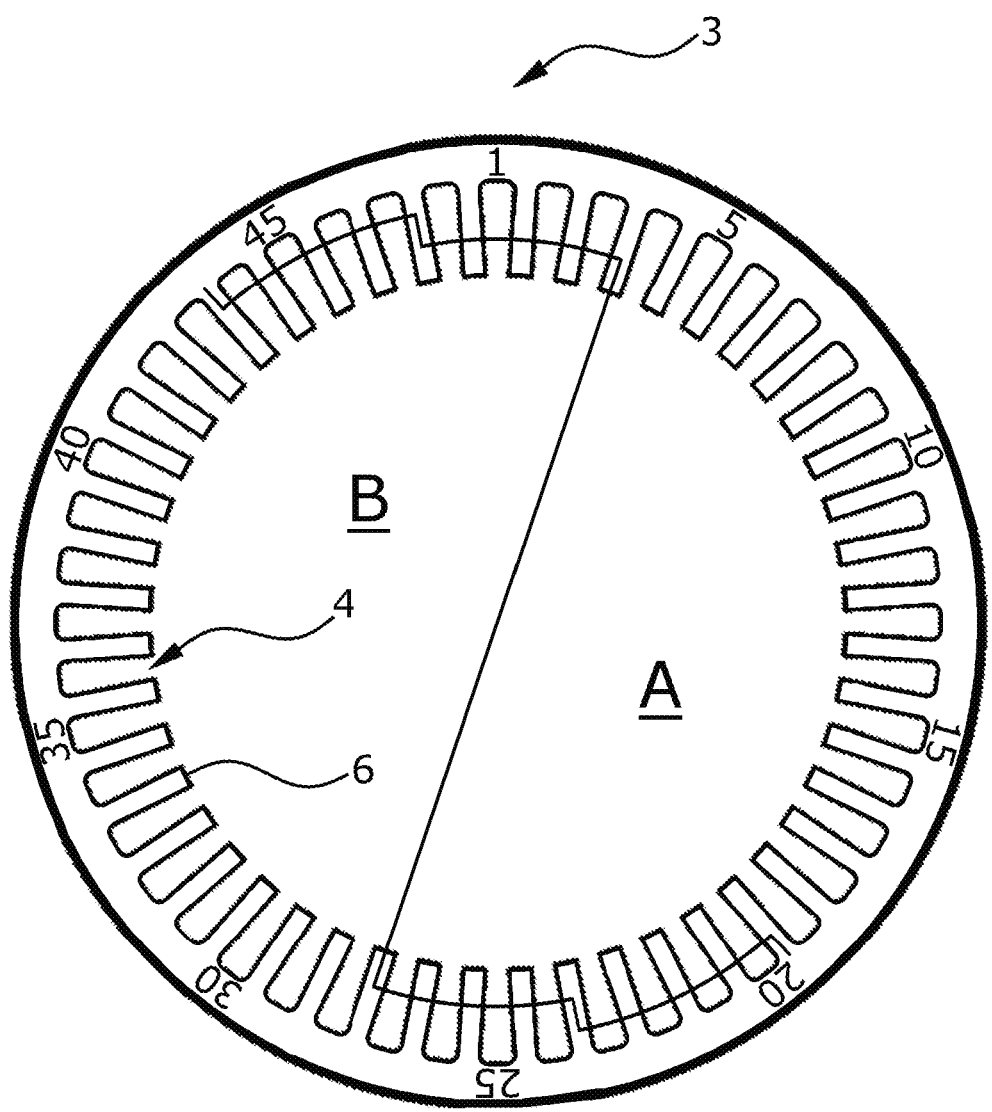
FIG. 2 shows a plan view of a stator.

FIG. 2 shows a plan view of the stator 3 with the consecutively numbers slots 1-48. The stator 3 has 48 slots 4, which can receive the windings in three layers. In FIG. 2 the teeth 6 between the slots are also shown. In conjunction with FIG. 1 it is shown that the windings of the various phases of the various layers each overlap by at least four slots.

The stator in FIG. 2 is also divided into two stator regions A, B, so that in one embodiment the windings of one region can be connected to a 3-phase rectifier and the windings of the other region can be connected to another 3-phase rectifier.

Figure 3:
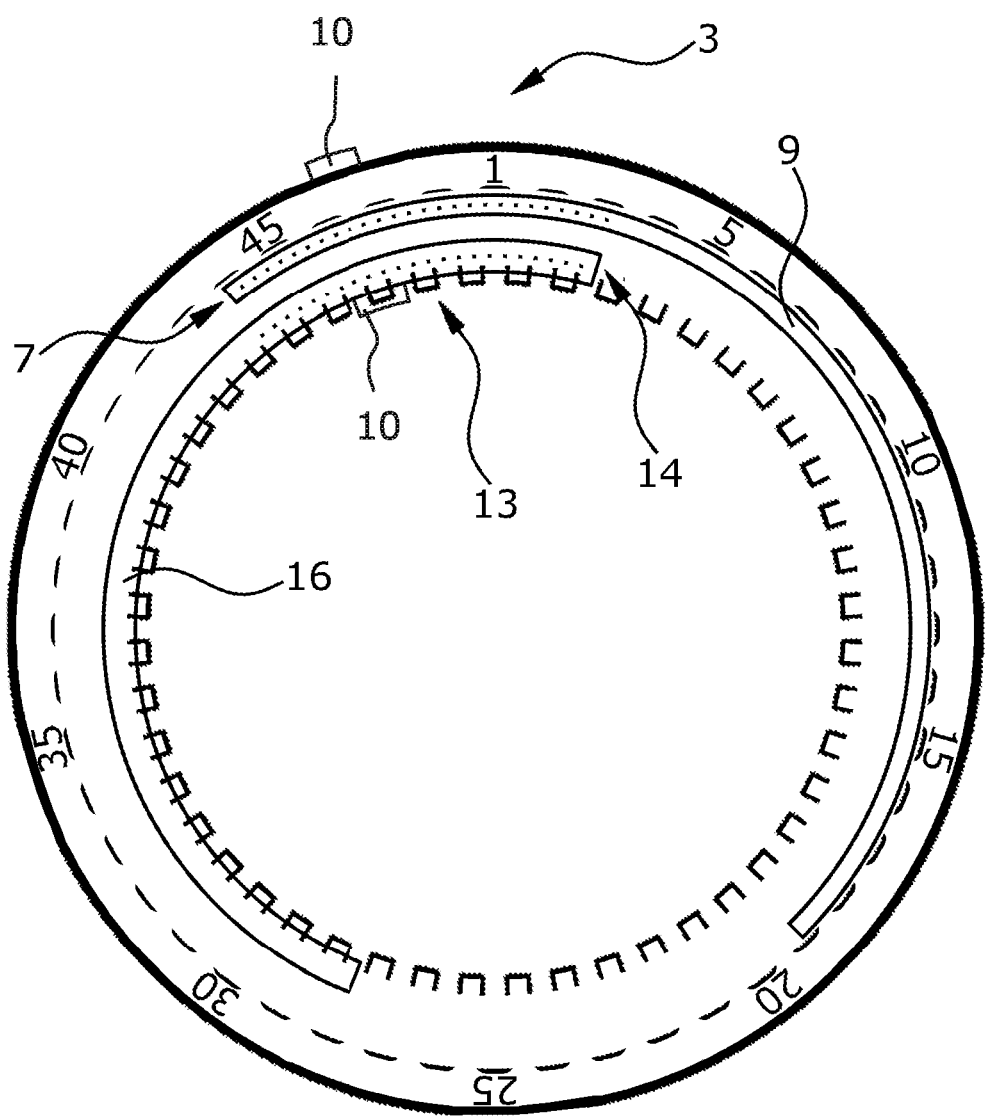
FIG. 3 shows a plan view of a stator with two offset windings in two layers.

In FIG. 3 the teeth 6 are only suggested, so as to provide a better view of the windings 9, 16 of the individual phases. The windings 9 of the phase A1 extend over a region 7 of the stator 3 from slot 19 to slot 44. The windings 16 of phase B3 of the second layer extend over a region 14 of the stator 3 from slot 28 to slot 3. The windings 9, 16 form an overlap region 13 from slot 44 to slot 3 with a length of eight slots. The overlap region 13 is thus shorter than the individual regions 7, 14 of the windings 9, 16. The regions 7, 14 are for example 24 slots long each.

A temperature detection unit 10, which is arranged in this overlap region 13, can measure the temperature of the windings 9, 16 of phases A1 and B3, for example using two sensors in each case. A temperature detection unit 10 must thus be arranged only at one point of the stator 3 so as to be able to detect the temperature of windings 9, 16 operated with different phases. It is thus sufficient to provide a connection for a temperature detection unit 10 only at this point of the stator.

Figure 4:
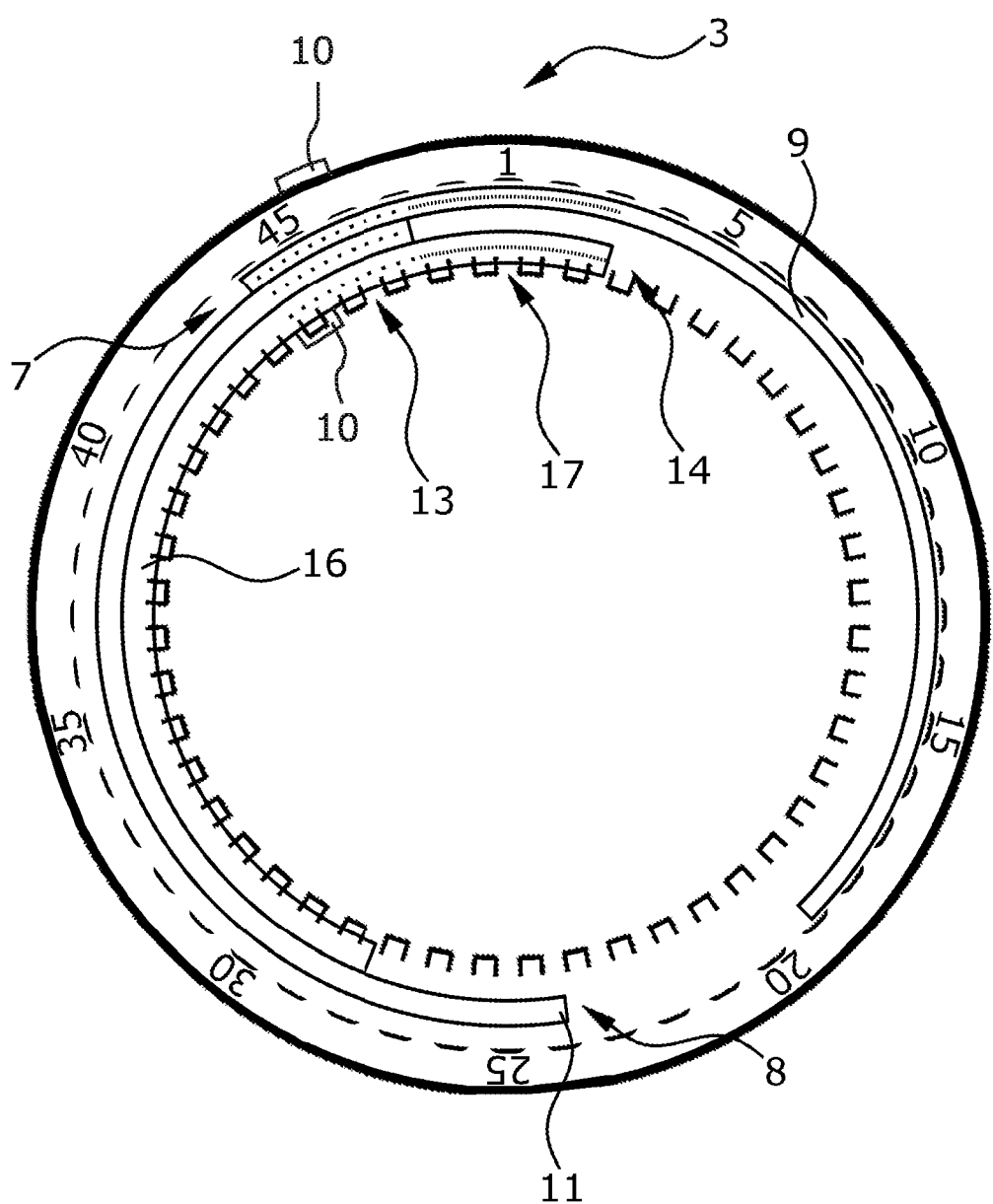
FIG. 4 shows a plan view of a stator with three offset windings in three layers.

FIG. 4 shows a stator 3 with the windings 9, 11, 16 in all three layers. The windings 9, 16 of the first and second layer extend over the same regions 7, 14 as in FIG. 3. The windings 11 of the third layer, which lies between the first and second layer, extend over the region 8 from slot 47 to slot 24. The three regions 7, 8, 14 are offset relative to one another and form an overlap region 13 with a size of 4 slots. The windings that are controlled with three different phases are thus located in this overlap region.

In this overlap region it is possible to monitor the temperature of three different windings, which are fed by three different phases, using a temperature detection unit 10 that for example has 3 temperature sensors.

Next to the overlap region 13, a further monitoring region 17 is also formed, which likewise is four slots long, however only windings of two instead of three different phases can be monitored there.

Figure 5:
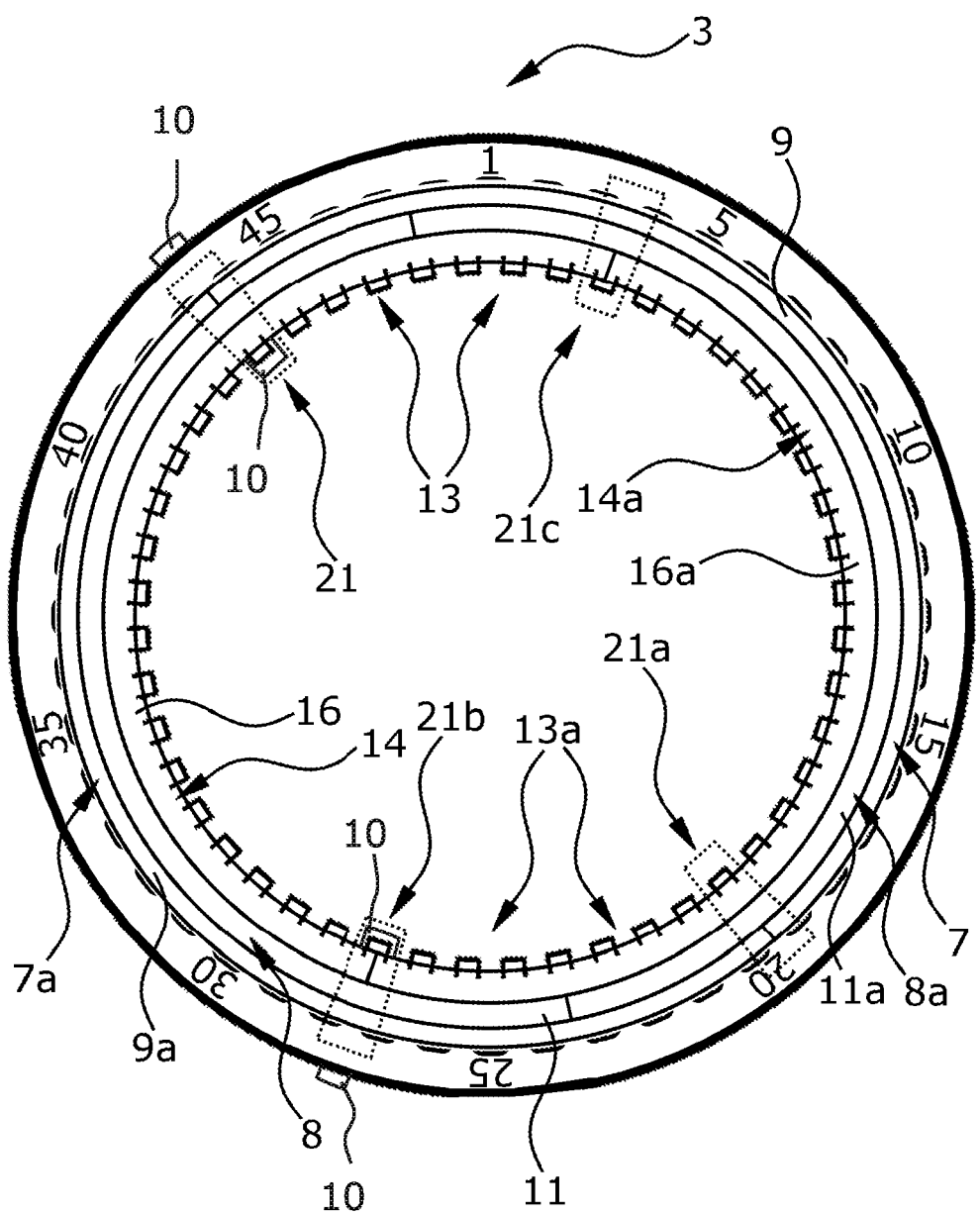
FIG. 5 shows a plan view of a stator with six offset windings in three layers.

FIG. 5 shows a stator 3 with six windings 9, 9a, 11, 11a, 16, 16a, which are fed by six phases of two 3-phase rectifiers. The windings 9, 11a, 16a are fed by one 3-phase rectifier, and the three windings 9a, 11, 15 are fed by another.

It can be seen by comparing FIGS. 5 and 2 that the windings 9, 11a, 16a lie in the stator region A and the windings 9a, 11, 16 lie in the stator region B.

A further comparison with FIG. 4 shows that the windings extend over a total of six regions 7, 7a, 8, 8a, 14, 14a.

The windings 9, 9a, 16, 16a in the regions 7, 7a, 14, 14a in the first or second layer are arranged adjacently in the same layer. Furthermore, the windings of the other regions also overlap in this region. An extended overlap region 21, 21a, 21b, 21c is thus formed, which is directly adjacent to the overlap region 13, 13a.

The extended overlap regions 21, 21a, 21b, 21c use a slot of the overlap regions 13, 13a and a further slot arranged next to it.

In the extended overlap region 21, 21a, 21b, 21c the temperature of four windings which are fed with four different phases can be determined at a position.

At the outer diameter of the stator 3 in the extended overlap region 21, 21a it is also possible to measure the temperature of windings that are fed by different rectifiers.

At the inner diameter of the stator 3 in the extended overlap region 21b, 21c it is possible to measure the temperature of windings that are fed by different rectifiers.

It is also possible to arrange two temperature detection units 10 in two extended overlap regions arranged next to one another 21, 21a or 21b, 21c. It is thus possible to measure the temperature of windings that are fed by different rectifiers, and nevertheless to control both temperature detection units 10 with one feed line on account of their proximity to one another.

For example, four extended overlap regions 21, 21a, 21b, 21c are shown in FIG. 5. These consist of slots 43-44, 19-20, 27-28, 3-4.

A temperature detection unit 10 with, for example, three sensors, which is arranged in one of the extended overlap regions can monitor the temperature of three windings in the inner and outer diameter using three sensors at two slots.

Figure 6:
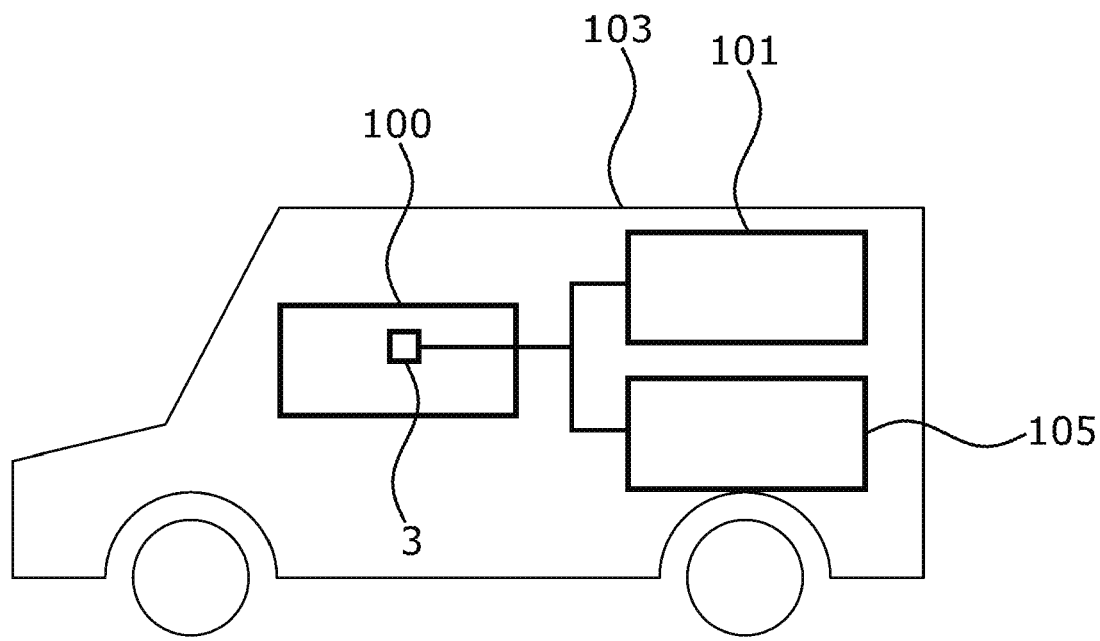
FIG. 6 shows a vehicle with a stator in an electric motor and two rectifiers.

FIG. 6 shows a vehicle 103 with an electric motor 100 and a stator 3. The windings of the stator are connected to two rectifiers 101, 105.

The invention claimed is:
1. A stator for an AC motor, comprising:
windings of a first layer, which extend over a first region of the stator and are connectable to a first phase;
windings of a second layer, which extend over a second region of the stator and are connectable to a second phase, the second region being offset relative to the first region to form at least one overlap region; and a temperature detection unit arranged in the at least one overlap region and including two sensors, one sensor being arranged at an outer diameter of the stator or of a winding head of the stator and another sensor being arranged at an inner diameter of the stator or of the winding head of the stator, to measure temperatures of the windings in the at least one overlap region, wherein the at least one overlap region is smaller than the first region and the second region.

2. The stator (3) according to claim 1, further comprising: windings of a third layer which lie between the first layer and the second layer extend over a third region of the stator and are connectable to a third phase the third region being offset relative to the first region and the second region to overlap the first region and the second region at the at least one overlap region, wherein the temperature detection unit is arranged in the at least one overlap region to measure the temperatures of the windings in the at least one overlap region, and the at least one overlap region is smaller than the first region, the second region, and the third region.

3. The stator according to claim 2, further comprising: another windings of the first layer which extend over a fourth region of the stator, other than the first region in the first layer, and are connectable to a fourth phase;

another windings of the second layer which extend over a fifth region of the stator, other than the second region in the second layer, and are connectable to a fifth phase;

another windings of the third layer which extend over a sixth region of the stator, other than the third region in the third layer, and are connectable to a sixth phase;

wherein the windings and the another windings of the first layer, the windings and the another windings of the second layer, and the windings and the another windings of the third layer are overlapped at a plurality of overlap regions, and each of the plurality of overlap regions is smaller than each of the first, second, third, fourth, fifth, and sixth regions, wherein the temperature detection unit is arranged in at least one of the plurality of overlap regions to measure the temperatures of the windings and the another windings in the plurality of overlap regions.

4. The stator according to claim 3, wherein the windings and the another windings of the first layer and the second layer form extended overlap regions with the windings and the another windings of the third layer wherein the temperature detection unit is arranged in each of the extended overlap regions to measure the temperatures of the windings in each of the extended overlap regions.

5. The stator according to claim 3, wherein an extended overlap region is formed in a region adjacent to each of the plurality of overlap regions in which a boundary region of the first region and the fourth region and one of the second region and the fifth region are overlapped, to measure the temperatures of the windings in each of the extended overlap regions.

6. The stator according to claim 5, wherein an extended overlap region is formed in a region adjacent to each of the plurality of overlap regions in which a boundary region of the second region and the fifth region and one of the first region and the fourth region are overlapped, to measure the temperatures of the windings in each of the extended overlap regions.

7. The stator according to claim 2, wherein each of the windings of the first layer, the second layer, and the third layer includes one end and another end opposed to the one end in a circumferential direction of the stator, and the one end of the windings of the third layer is arranged between the another end of the windings of the first layer and the one end of the second layer to form the at the at least one overlap region.

8. An electric motor comprising:
the stator according to claim 1,
at least two rectifiers, each of the at least two rectifiers being connected to the windings, which lie in different layers.

9. The electric motor comprising:
a stator according to claim 1,
at least two rectifiers each of the at least two rectifiers being connected to the windings in three different layers and a half stator region.

10. The electric motor according to claim 9, wherein the temperature detection unit detects the temperatures of at least two windings in different stator regions.

11. The electric motor according to claim 10, wherein the electric motor has at least two temperature detection units and each of the at least two temperature detection units is arranged in an extended overlap region.

12. A vehicle comprising:
a stator according to claim 1.

* * * * *